Aug. 30, 1949.   R. L. HOPKINS   2,480,580
FISH LURE
Filed Sept. 20, 1945

Inventor
ROBERT L. HOPKINS

By *Clarence A. O'Brien and Harvey B. Jacobson*
Attorneys

Patented Aug. 30, 1949

2,480,580

UNITED STATES PATENT OFFICE 2,480,580

FISH LURE

Robert L. Hopkins, Norfolk, Va.

Application September 20, 1945, Serial No. 617,519

3 Claims. (Cl. 43—42.45)

This invention relates to a novel fish lure, and the primary object of the invention is to provide a device of this kind which is formed in a particular and most satisfactory way so that the transverse center of gravity of the lure is nearer the end to which the hook is attached than to the end to which the line is attached, whereby the first named end will lead in casting or sinking and will thereby prevent the hook from fouling or becoming engaged with the line.

A further object of the invention is to provide a fish lure which is simple in construction, efficient in use, and so constructed as to serve the purpose of a trolling or under-surface lure.

The exact nature of the present invention, as well as other objects and features thereof, will become apparent from the following description when considered in connection with the accompanying drawing.

Figure 1:
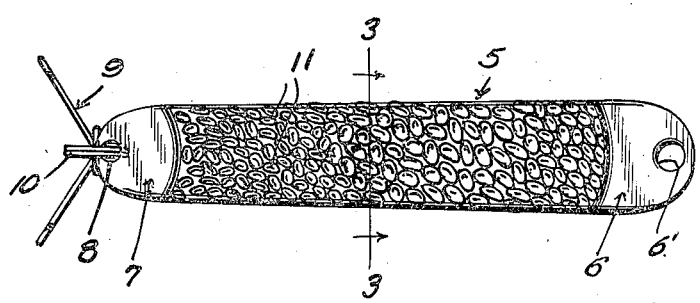
Figure 1 is a side elevational view of a fish lure constructed in accordance with the present invention.
Figure 2:
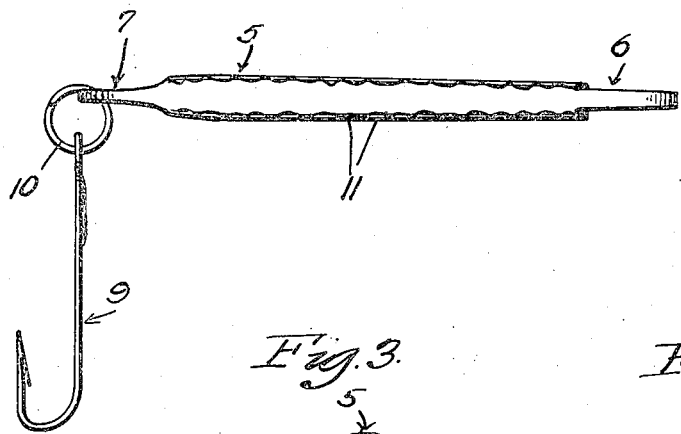
Figure 2 is a top plan view thereof.
Figure 3:
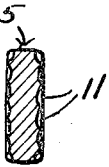
Figure 3 is a transverse section taken on the line 3—3 of Figure 1.

Referring in detail to the drawing, the present fish lure consists of a solid elongated slat-like bar having a major body portion 5, a reduced end ear portion 6 apertured to 6' to facilitate attachment of the fishing line thereto, and a tapered or reduced end ear portion 7 apertured at 8 to facilitate connection of the fish hook 9 thereto as by means of a ring 10. Thus, the portion 5 presents the appearance of the body portion of a fish, the end portion 6 the head of a fish, and the end portion 7 the tail of the fish. The lure preferably has a bright surface, and the body portion 5 is provided with numerous small indentations 11 having the appearance of fish scales and providing numerous facets for reflection of light so that the lure will be very attractive to fish.

The body portion 5 is preferably provided with substantially flat sides and is preferably substantially uniform width from end to end as measured from one longitudinal edge to the other. The body 5, however, is tapered thinner from the end 7 to which the hook 9 is attached to the end 6 to which the line is adapted to be attached, whereby the transverse center of gravity of the lure is located nearer the end 7 than the end 6. In this way, the end 7 to which the hook 9 is attached is caused to always lead in casting or sinking so that the hook will not foul the fishing line or the leader thereof by becoming hooked onto the same. This fact has been effectively demonstrated in actual practice over a long period of usage of the present lure. Any type of hook may be employed at 9, that shown by way of example being of the multiple type.

As the device is to serve the purpose of a trolling lure, it is constructed of metal which has a bright surface and which is not affected by water, such as an alloy of lead and tin, aluminum or stainless steel. Also, this lure may be made either by a drop-forging or casting operation from a single solid piece of metal.

From the foregoing description, it is believed that the construction and advantages of the present invention will be readily understood and appreciated by those skilled in the art. Weight and streamline shape makes the present lure ideal for casting, as there is very little wind resistance to travel of the lure. Also, the lure does not spin to twist the line when trolled, and it is very durable in construction, attractive in appearance, and efficient in use.

Figure 4:
Figure 4 is a view similar to Figure 3, showing a modification.

While the body portion preferably has flat sides, it may be of oval cross section or provided with convex sides, as in Figure 4.

What I claim is:

1. A trolling or under-surface fish lure comprising an elongated slat-like bar of solid metal, said bar comprising a major body portion and apertured end ear portions of reduced thickness, a hook connected to one of said end ear portions, the other end ear portion being adapted to have a fishing line attached thereto, said body being of substantially uniform width and being tapered in thickness from the first named end ear portion to said other end ear portion so that the center of gravity of the lure is nearer said first named end portion, whereby the end of the lure having the hook attached thereto will always lead in casting and sinking to prevent engagement of the hook with the line, said body portion having a bright surface and being provided with numerous small indentations in the opposite sides thereof providing light reflecting facets in the form of scales.

2. A trolling or under-surface fish lure comprising a solid slat-like bar having similar fish-attracting surface characteristics on both sides thereof, the terminal end portions of said bar being reduced in thickness and transversely apertured to provide front and rear ears, the major intermediate portion of said bar being tapered in thickness from the rear ear thereof to the front ear of the same, and a hook attached to said rear ear of the bar, said front ear being adapted to have a fishing line attached thereto, whereby the rear hook-carrying end of the bar will always lead in casting or sinking to prevent engagement of the hook with the fishing line.

3. A trolling or under-surface fish lure comprising a solid slat-like bar of substantially uniform width and having similar fish-attracting surface characteristics on both sides thereof, said bar having plate-like front and rear end ear portions of reduced thickness and each provided with an aperture, a fish hook, means engaged in the aperture of the rear end ear portion for connecting the hook to the lure, the aperture of the front end ear portion facilitating attachment of a fishing line to the lure, said bar being slightly and gradually tapered in thickness from the rear end ear portion to the front end ear portion so that its center of gravity is nearer the rear end of the lure than the front end thereof, whereby the hook carrying end of the lure will always lead in casting to prevent engagement of the hook with the fishing line.

ROBERT L. HOPKINS.

REFERENCES CITED

The following references are of record in the file of this patent:

UNITED STATES PATENTS

| Number | Name | Date |
|---|---|---|
| 717,681 | Hodge | Jan. 6, 1903 |
| 1,881,823 | McKenzie | Oct. 11, 1932 |
| 1,897,291 | Andrews | Feb. 14, 1933 |
| 2,086,457 | Zielesch | July 6, 1937 |
| 2,459,959 | Pelmarsh | Jan. 25, 1949 |